United States Patent
Kusumi

[15] 3,680,256
[45] Aug. 1, 1972

[54] PLANT CULTIVATING DEVICE

[72] Inventor: Masami Kusumi, 3-10-306 Zengyo Danchi 3768-3 Fujisawa, Fujisawa, Japan

[22] Filed: Oct. 10, 1969
[21] Appl. No.: 865,270

[52] U.S. Cl. ............................. 47/34.11, 206/46 PL
[51] Int. Cl. ............................................. A01g 9/02
[58] Field of Search........ 47/34, 37, 34.11; 206/46 PL

[56] References Cited

UNITED STATES PATENTS 2,039,442  5/1936  Mulford..........................47/37
2,057,972  10/1936 Pieck..............................47/34

FOREIGN PATENTS OR APPLICATIONS 693,069    6/1953  Great Britain...................47/37
1,275,153  9/1961  France............................47/37
1,308,164  9/1962  France.........................47/34.11

*Primary Examiner*—Robert E. Bagwill
*Attorney*—Kenneth S. Goldfarb

[57] ABSTRACT

A plant cultivating device comprising a fluid-tight container in the form of a can or the like having an imperforate top which may be removed through the use of a can opener. A filling of soil-like material for growing seeds together with a plate having a coating of a fertilizer on which seeds are placed. The bottom of the container is perforated and an adhesively attached cover is secured for convenient removal from the bottom.

1 Claim, 3 Drawing Figures

INVENTOR
MASAMI KUSUMI

PLANT CULTIVATING DEVICE

This invention relates to a plant cultivating device for growing seeds such as those of ornamental flowers, vegetables, fruits, fungi, mushrooms, or the like, the seeds being disposed in a sealed container until ready for growth.

Heretofore various devices have been devised for containing and growing seeds. It is the concept of this invention to provide a fluid-tight sealed container whereby the seeds may be prevented from germinating until an adhesively affixed cover is removed from the bottom of the container and the imperforate top has been cut open.

In the past, containers for growing seeds have had to have costly constructions so that the tops may be removed therefrom to permit the seeds to germinate. It is a concept of the present invention to package the seeds in a convenient manner whereby the top of a container may be cut open through the use of a can opener or the like for facilitating the introduction of water. A removable cover may be removed to permit drainage of water through the perforated bottom of the container.

Still further objects and features of this invention reside in the provision of a plant cultivating device that is simple in construction, capable of being manufactured at a relatively low cost so as to permit wide distribution and utilization and which is convenient and easy to use.

These, together with the various ancillary objects and features of this invention, which will become apparent as the following description proceeds, are attained by this plant cultivating device, a preferred embodiment of which is illustrated in the accompanying drawing, by way of example only, wherein.

Figure 1:
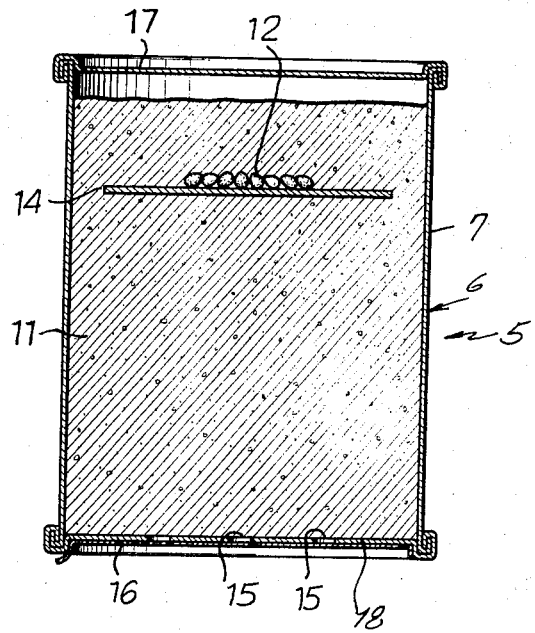
FIG. 1 is a vertical sectional view of a plant cultivating device according to the concepts of the present invention.
Figure 2:
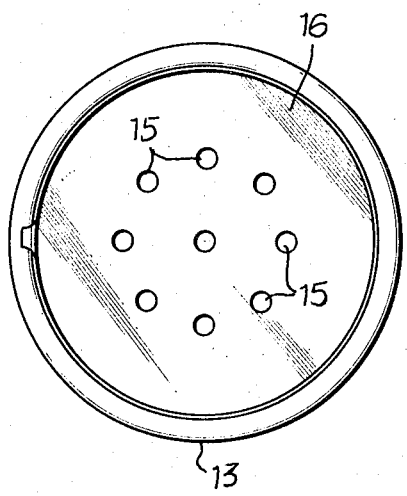
FIG. 2 is a bottom plan view of the invention.
Figure 3:
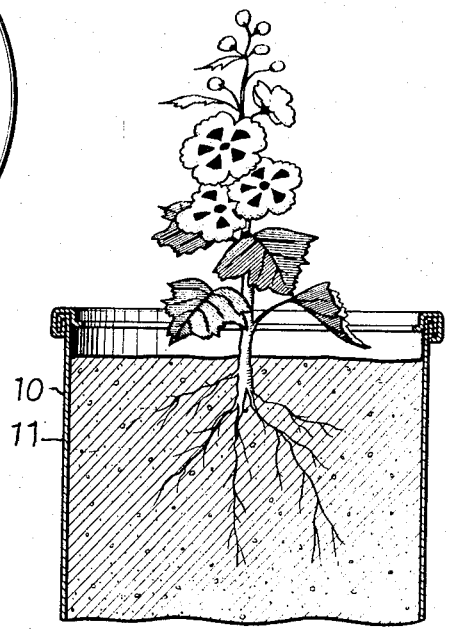
FIG. 3 is a partial vertical sectional view illustrating the device with a plant growing therein in condition for appreciation.

With continuing reference to the accompanying drawing, wherein like reference numerals designate similar parts throughout the various views, reference numeral 5 is used to generally designate the plant cultivating device in accordance with the concepts of the present invention. This plant cultivating device includes a container 6 having a cylindrical side wall 7 which may be in the form of a tin can or the like and which has a cultivating medium or material 11 of sphagnum, peat or sawdust or the like as soil for growing seeds or spores 12.

The sealed container 10 is preferably in the form of a can because a can body such as a tin can is capable of preserving the seeds, preventing disorders and/or germinating of the seeds so that the seeds may be stored to have a maximum shelf life, whereby the seeds may be stored for a long period and may later satisfy the curiosity and appreciation of the users. However, it is within the concept of the present invention that beyond a can, a container made of plastic having a main body and a threaded cap may be employed.

The seeds 12 are disposed on a plate or plate-like element 14 formed of any suitable material, such as plastic, paperboard, blotter paper, or the like, which is embedded in the cultivating medium or material 11 and supports one or more seeds 12 thereon in a desired arrangement. In this manner the seeds 12, spores or the like, may germinate at a suitable location and embedded within the cultivating material 11 with the plate 14 being disposed more adjacent the top of the container than the bottom. A coating of fertilizer is on the plate 14.

The bottom 18 of the container is provided with a plurality of apertures or openings 15 therein and the perforated bottom permits water to pass therethrough. Prior to use, a removable cover member 16 is adhesively affixed to the bottom 18 and seals the openings 15 in a fluid-tight manner, the cover 16 being made of any suitable impervious material preferably coated with a self-stick adhesive. The top 17 of the container is imperforate and is sealed to the side wall 7 of the container by crimping or in the usual manner of tin can construction.

In use, the top 17 is cut and opened through the use of a can opener in the conventional manner and then the cover member 16 is removed from the bottom end of the container to allow the openings 15 to communicate with the air. Then, water may be introduced through the open top and the seeds or spores 12 or the like may be grown or germinated in the same manner as in the ordinary cultivation of the plants and the like, including the blooming of flowers.

As described in the above, the present invention provides such a new and useful plant cultivating device which is convenient for portable conveyance and by which an appreciator can enjoy various kinds of plants or the like, according to preference.

I claim:

1. A plant cultivating device comprising a container having a side wall, an imperforate top secured to said side wall and a perforated bottom secured to said side wall, a removable cover adhesively secured to said bottom, said container being filled with a material for growing seeds, including a plate imbedded in said material for receiving seeds thereon, said plate being disposed adjacent said top, and a coating of fertilizer on said plate, said container being a can, said cover having a coating of self-stick adhesive thereon detachably securing said cover to said bottom.

* * * * *